Patented Feb. 10, 1925.

1,525,655

UNITED STATES PATENT OFFICE.

JAMES F. MOLLEN, OF CLEVELAND, AND WALTER W. PATNOE, OF TIFFIN, OHIO, ASSIGNORS TO THE DOLOMITE PRODUCTS COMPANY, OF CLEVELAND, OHIO, A CORPORATION OF OHIO.

SYNTHETIC REFRACTORY MATERIAL.

No Drawing. Original application filed February 2, 1920, Serial No. 335,689. Divided and this application filed September 23, 1920. Serial No. 412,227.

*To all whom it may concern:*

Be it known that we, JAMES F. MOLLEN and WALTER W. PATNOE, both citizens of the United States, and residents of Cleveland, county of Cuyahoga, and State of Ohio, and of Tiffin, county of Seneca, and State of Ohio, respectively, have jointly invented a new and useful Improvement in Synthetic Refractory Materials, of which the following is a specification, the principle of the invention being herein explained and the best mode in which we have contemplated applying that principle, so as to distinguish it from other inventions.

The improved refractory material, forming the subject matter of the present invention, is more particularly designed for use as a lining for furnaces such as are employed in steel manufacture, for example. The invention relates more particularly to an improved composition of matter on the order of that described and claimed in United States Letters Patent No. 1,230,430, to George W. Patnoe, as consisting of the granular product resulting from the calcination of a mixture of finely divided magnesian limestone and a small percentage of argillaceous matter containing iron oxide. The method or process herein disclosed for manufacturing the present improved refractory material forms the subject matter of our co-pending application filed February 2, 1920, Serial No. 355,689, out of which the present case has been required to be divided.

To the accomplishment of the foregoing and related ends, the invention, then, consists of the matter hereinafter fully described and particularly pointed out in the claims, the following description setting forth in detail one approved combination of ingredients embodying our invention, such disclosed combination constituting, however, but one of various forms in which the principle of the invention may be used.

As in the case of the furnace lining material which forms the subject matter of the aforesaid patent, in carrying out the present invention we preferably take a relatively pure magnesian limestone or dolomite, and render it dense and stable by incorporating therewith a certain small percentage of fluxing material, which preferably consists of silica, alumina and iron oxide, inclusively referred to as argillaceous material. The specific differences in the proportions of the ingredients in the finished product will be subsequently set forth; but as a typical analysis of the ingredients employed, we give the following, viz, 91 per cent of raw dolomite composed of magnesium carbonate and calcium carbonate in the relative proportions of 45 per cent and 55 per cent; 5½ per cent of iron oxide, such as hæmatite ore; and 3½ per cent of fire clay.

As in the case of such previously patented product, the principal step in the process of manufacture is the calcination of the raw dolomite or magnesian limestone, to which has been added the proper amount of fluxing materials, such calcination being accomplished in a rotary kiln disposed at a slightly inclined axis similar to that regularly employed in the calcination of ordinary limestone. The raw material, including the fluxing agents in question, is preferably finely ground with the addition of water preliminarily to its introduction at one end of such kiln, the mixture being sufficiently dilute to form a slurry. The initial effect of the heat, combined with the rotative movement of the kiln is to cause this material to form mud balls or lumps, and heretofore difficulty has been experienced, whatever the proportion of fluxing materials used, in that such balls or lumps tend to disintegrate and reduce to powder, and the material is thus in the form of dust when it reaches the hottest zone at the further end of the furnace, where the temperature is from 2600° to 3000° F. This condition is objectionable, inasmuch as the preferred form of the material is that of a granular sintered product resulting from the calcination of the foregoing ingredients.

We have found the objectionable condition referred to can be entirely eliminated if, to the ingredients previously enumerated, there be added from one to five per cent of common salt (sodium chloride), approximately 3½ per cent giving the best results, with the exact proportion of other ingredients thus enumerated. This salt seems to have a mechanical or physical effect merely, rendering the slurry heavier or denser, and so causing it to form well defined and distinct globules or nodules which will remain intact until the sintering stage is reached. The addition of the relatively small amount of salt, in other words, will completely do away with the objectionable dusting, and cause the material to come through as a clean granular product at the discharge end of the furnace. The salt is apparently entirely driven out by the heat, none being left in such product, except the merest trace, so that its action would appear to be other than a chemical one.

A typical analysis of the finished product, made from the raw materials in the proportions previously indicated, and by the process just described, is as follows, viz, lime 50.3 per cent, magnesia 34 per cent, silica 3.54 per cent, alumina 2.12 per cent, and iron oxide 8.13 per cent, the balance being accounted for by a trace of manganese monoxide and the loss incidental to analysis.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:—

1. A refractory material suitable for furnace linings and the like, consisting of the calcination product of raw dolomite admixed with a small percentage of argillaceous matter together with a small percentage of common salt, such material being in the form of heat-compacted masses of desired shape and size substantially clean and free from dust directly as made and having approximately the following percentage composition, viz, lime and magnesia together eighty-five (85) and argillaceous matter fourteen (14), the salt being substantially eliminated incidentally to calcination of the raw ingredients.

2. A refractory material suitable for furnace linings and the like, consisting of the calcination product of raw dolomite admixed with a small percentage of argillaceous matter together with from one to five (1–5) per cent of common salt, such material being in the form of heat-compacted masses of desired shape and size substantially clean and free from dust directly as made and having approximately the following percentage composition, viz, lime and magnesia together eighty-five (85), silica three and one-half (3½), alumina two and one-quarter (2¼), and iron oxide eight and one-quarter (8¼), the salt being substantially eliminated incidentally to calcination of the raw ingredients.

Signed by us, this 18th day of Sept., 1920.

JAMES F. MOLLEN.
WALTER W. PATNOE.